United States Patent
Cannella, Jr. et al.

(10) Patent No.: US 7,532,673 B2
(45) Date of Patent: May 12, 2009

(54) TRANSPORT OF MODULATION SYMBOLS IN A COMMUNICATIONS SYSTEM

(75) Inventors: James E. Cannella, Jr., Roswell, GA (US); Larry S. McKinney, Hoschton, GA (US); William D. Woodward, Jr., Lilburn, GA (US)

(73) Assignee: Scientific-Atlanta, Inc., Lawrenceville, GA (US)

( * ) Notice: Subject to any disclaimer, the term of this patent is extended or adjusted under 35 U.S.C. 154(b) by 984 days.

(21) Appl. No.: 10/768,355

(22) Filed: Jan. 30, 2004

(65) Prior Publication Data

US 2005/0169164 A1 Aug. 4, 2005

(51) Int. Cl.
*H04L 27/36* (2006.01)

(52) U.S. Cl. .............. 375/260; 375/271; 375/298; 375/302

(58) Field of Classification Search ........ 375/259, 375/260, 271, 295, 298, 302
See application file for complete search history.

(56) References Cited

U.S. PATENT DOCUMENTS

| | | | |
|---|---|---|---|
| 4,720,839 A * | 1/1988 | Feher et al. ........... 375/291 |
| 5,717,722 A | 2/1998 | Mori ................... 375/326 |
| 6,072,363 A * | 6/2000 | Steigenberger et al. ..... 330/126 |
| 6,253,235 B1 * | 6/2001 | Estes ................... 709/217 |
| 6,285,654 B1 | 9/2001 | Marchok et al. ........ 370/208 |
| 6,347,071 B1 | 2/2002 | Cupo et al. ............ 370/203 |
| 6,430,199 B1 * | 8/2002 | Kerpez ................. 370/493 |
| 6,584,078 B1 * | 6/2003 | Betts ................... 370/276 |
| 6,771,667 B2 * | 8/2004 | Paneth et al. .......... 370/478 |
| 2002/0136203 A1 | 9/2002 | Liva et al. ............ 370/352 |
| 2003/0016701 A1 * | 1/2003 | Hinson ................. 370/480 |
| 2003/0066087 A1 | 4/2003 | Sawyer et al. ......... 725/111 |
| 2004/0170239 A1 * | 9/2004 | Fazel et al. ........... 375/354 |

FOREIGN PATENT DOCUMENTS

WO  WO 01/45305  6/2001

* cited by examiner

*Primary Examiner*—David B Lugo
(74) *Attorney, Agent, or Firm*—Edell, Shapiro & Finnan, LLC

(57) ABSTRACT

A broadband communications system uses modulation symbol transport over communications links to replace baseband or bandpass signal transport, thereby providing longer communication distances, lower communication link bandwidth, and greater signal quality. Subsequent to transporting the modulation symbols, the symbols are modulated and further transmitted over the RF transmission network.

20 Claims, 8 Drawing Sheets

TRANSPORT OF MODULATION SYMBOLS IN A COMMUNICATIONS SYSTEM

FIELD OF THE INVENTION

This invention relates generally to broadband communications systems, such as cable television systems, and more specifically to transporting modulation symbols over the broadband communications system.

BACKGROUND OF THE INVENTION

FIG. 1 is a block diagram illustrating an example of a conventional ring-type broadband communications system, such as a two-way hybrid/fiber coaxial (HFC) network. It will be appreciated that other networks exist, such as a star-type network. These networks may be used in a variety of systems, including, for example, cable television networks, voice delivery networks, and data delivery networks to name but a few. The broadband signals transmitted over the networks include multiple information signals, such as video, voice, audio, and data, each having different frequencies. Headend equipment included in a signal source, or a headend facility 105, receives incoming information signals from a variety of sources, such as off-air signal source, a microwave signal source, a local origination source, and a satellite signal source and/or produces original information signals at the facility 105. The headend 105 processes these signals from the sources and generates forward, or downstream, broadcast signals that are delivered to a plurality of subscriber equipment 110. The broadcast signals can be digital or analog signals and are initially transported via optical fiber 115 using any chosen transport method, such as SONET, gigabit (G) Ethernet, 10 G Ethernet, or other proprietary digital transport methods. The broadcast signals are typically provided in a forward bandwidth, which may range, for example, from 45 MHz to 870 MHz. The information signals may be divided into channels of a specified bandwidth, e.g., 6 MHz, that conveys the information. The information is in the form of carrier signals that transmit the conventional television signals including video, color, and audio components of the channel. Also transmitted in the forward bandwidth may be telephony, or voice, signals and data signals.

Optical transmitters (not shown), which are generally located in the headend facility 105, convert the electrical broadcast signals into optical broadcast signals. In most networks, the first communication medium 115 is a long haul segment that transports the signals typically having a wavelength in the 1550 nanometer (nm) range. The first communication medium 115 carries the broadcast optical signal to hubs 120. The hubs 120 may include routers or switches to facilitate routing the information signals to the correct destination location (e.g., subscriber locations or network paths) using associated header information. The optical signals are subsequently transmitted over a second communication medium 125. In most networks, the second communication medium 125 is an optical fiber that is typically designed for shorter distances, and which transports the optical signals over a second optical wavelength, for example, in the 1310 nm range.

From the hub 120, the signals are transmitted to an optical node 130 including an optical receiver and a reverse optical transmitter (not shown). The optical receiver converts the optical signals to electrical, or radio frequency (RF), signals for transmission through a distribution network. The RF signals are then transmitted along a third communication medium 135, such as coaxial cable, and are amplified and split, as necessary, by one or more distribution amplifiers 140 positioned along the communication medium 135. Taps (not shown) further split the forward RF signals in order to provide the broadcast RF signals to subscriber equipment 110, such as set-top terminals, computers, telephone handsets, modems, televisions, etc. It will be appreciated that only one subscriber location 110 is shown for simplicity, however, each distribution branch may have as few as 500 or as many as 1000 subscriber locations. Additionally, those skilled in the art will appreciate that most networks include several different branches connecting the headend facility 105 with several additional hubs, optical nodes, amplifiers, and subscriber equipment. Moreover, a fiber-to-the-home (FTTH) network 145 may be included in the system. In this case, optical fiber is pulled to the curb or directly to the subscriber location and the optical signals are not transmitted through a conventional RF distribution network.

In a two-way network, the subscriber equipment 110 generates reverse RF signals, which may be generated for a variety of purposes, including video signals, e-mail, web surfing, pay-per-view, video-on-demand, telephony, and administrative signals. These reverse RF signals are typically in the form of modulated RF carriers that are transmitted upstream in a typical United States range from 5 MHz to 40 MHz through the reverse path to the headend facility 105. The reverse RF signals from various subscriber locations are combined via the taps and passive electrical combiners (not shown) with other reverse signals from other subscriber equipment 110. The combined reverse electrical signals are amplified by one or more of the distribution amplifiers 140 and generally converted to optical signals by the reverse optical transmitter included in the optical node 130 before being transported through the hub ring and provided to the headend facility 105.

FIG. 2 is a block diagram of one branch in a conventional communications system 200. In the conventional network 200, the signals may be transmitted in a Moving Pictures Experts Group (MPEG) transport stream format. The signals are modulated with a bandpass modulator 210. The bandpass modulator 210 frames, encodes, and modulates the MPEG signals in a known manner. The modulation scheme may be quadrature amplitude modulation (QAM) with a 64-QAM or 256-QAM transport stream format. Subsequently, the modulated signals are transmitted over a transmission segment 215, which can be optical fiber, waveguides, coaxial cable, or free space. A plurality of receivers 220 subsequently demodulate the modulated signals in a known manner to recover the originally transmitted signals, where the demodulator typically includes a QAM demodulator, a decoder, and MPEG framing equipment. Only one transmission segment 215 coupled to the plurality of receivers 220 is shown, however, it will be appreciated that there are typically several distinct transmission segments each coupled to a bandpass modulator 210.

FIG. 3 illustrates a communications system 300 that includes the conventional communications system 200 and a baseband transport segment 305. The communications system 300 is a first improved system of the conventional communications system 200. The signal source 205 preferably provides MPEG transport stream signals and, prior to bandpass modulating, transports the signals via the baseband communications transport segment 305, which in this improved system can be, for example, SONET, RPR IEEE 802.17, or Ethernet 10/100/T segments. Subsequently, the bandpass modulator 210, which is typically enclosed within a hub or node located at the remote end of the baseband transport segment 305, receives the baseband signals and creates bandpass signals that are then transmitted via the transmission segment 215 to the plurality of receivers 220.

Advantageously, the communications system 300, as illustrated, allows for greater distances between the signal source 205 and the plurality of receivers 220 than the communications system of FIG. 2. Furthermore, the baseband transport segment 305 does not introduce any degradation to the source signal, and may be regeneratively repeated to produce a cascade of segments, thereby further extending the distance between the signal source 205 and receivers 220. Additionally, the baseband transport segment bandwidth is essentially the same as the bandwidth of the source signal. It will be appreciated that compression techniques may be employed to reduce the required bandwidth. Disadvantageously, however, the communications system 300 requires a network topology that may be inappropriate for certain applications. For example, broadcast or multicast applications that require the source signal to be transmitted to multiple geographically distinct receivers through multiple baseband transport segments require additional bandpass modulators at the remote end of every baseband transport segment, thereby increasing the system management and expense.

FIG. 4 illustrates a communications system 400 that is a further improved transport system. The communications system 400 utilizes a digital bandpass transport system 402 in the middle of the conventional communications system 200. The communications system 400 includes the signal source 205 where the signals are subsequently modulated by the bandpass modulator 210. The digital bandpass transport system 402 includes a digitizing interface 405 that digitizes the bandpass signals, or bandpass waveform, into a digital stream. Digitizing is typically accomplished by using an analog-to-digital (A/D) converter that samples the bandpass waveform to produce digital bits included in the digital stream or, alternatively, the digitizing interface 405 may use other more complex signal processing systems. Subsequently, the digital stream is provided to a digital baseband transport segment 410. At the remote end of the digital baseband transport segment 410, a bandpass waveform regenerator 415 recovers the bandpass waveform and, subsequently, transmits the recovered analog bandpass signals across the conventional transmission segment 215 to the plurality of receivers 220. The bandpass waveform regenerator 415 may simply be a digital-to-analog (D/A) converter or other more complex signal processing systems.

Advantageously, like the communications system 300 in FIG. 3, the communications system 400 also allows for signal transport and transmission over greater distances than the system illustrated in FIG. 2. However, the communications system 400 does not require a bandpass modulator 210 at the end of every baseband transport segment 305 in the system where several distinct and separate transport segments exist. Disadvantageously, however, the signal quality for the regenerated bandpass signal is limited by the bit resolution of the digital sample stream provided by the digitizing interface 405. Furthermore, additional bandwidth is typically required to prevent signal aliasing according to the Nyquist sampling theory of the A/D converter, to accommodate the excess bandwidth or frequency deviation inherent to the chosen modulation scheme, or to provide guardband for practical filter implementation, to name but a few. The segment bandwidth, therefore, is very high relative to the bandwidth of the systems illustrated in FIGS. 2 and 3.

What is needed, therefore, is an improved communications system and method of transporting signals that focuses on the advantages existing in the previously mentioned system topologies while not degrading the performance in other areas. More specifically, a system is needed that has the advantages of greater transport segment distances, low signal bandwidth requirements, high signal quality, while also decreasing the system maintenance and expense.

DETAILED DESCRIPTION OF A PREFERRED EMBODIMENT

The present invention will be described more fully hereinafter with reference to the accompanying drawings in which like numerals represent like elements throughout the several figures, and in which exemplary embodiments of the invention are shown. This invention may, however, be embodied in many different forms and should not be construed as limited to the embodiments set forth herein; rather, the embodiments are provided so that this disclosure will be thorough and complete, and will fully convey the scope of the invention to those skilled in the art. For example, the present invention is directed to a cable television system that transports video, voice, and data signals in typically an MPEG format. The present invention, however, can be applied to any system that can utilize modulation symbols. The present invention is described more fully hereinbelow.

Figure 5:
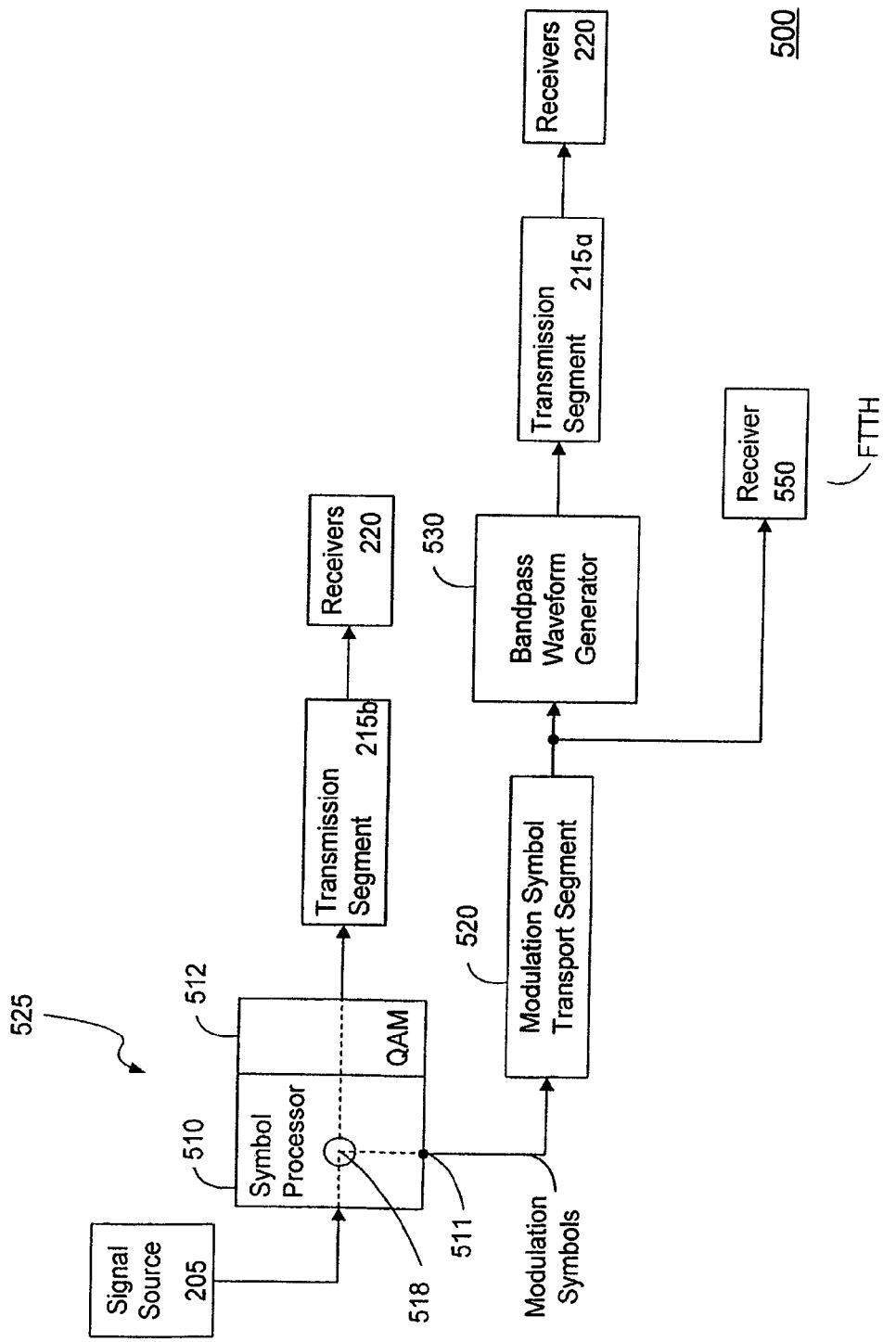
FIG. 5 illustrates a communications system that transports modulation symbols in accordance with the present invention.

FIG. 5 illustrates a communications system 500 that transports modulation symbols in accordance with the present invention. The communications system 500 includes a modulation symbol processor 510, a modulation symbol transport segment 520, and a bandpass waveform generator 530. Briefly, the modulation symbol processor 510 provides a continuous sequence of digital values, which are known in the art as modulation symbols, to the transport segment 520. After transport, the symbols are provided to the bandpass waveform generator 530 for conversion to conventional analog signals for further delivery downstream. In this manner, the transport of modulation symbols downstream to the transmission segment or directly to a receiver 550 is a unique and novel transport system in contrast with the transport systems 200, 300, 400 mentioned hereinabove.

Figure 3:
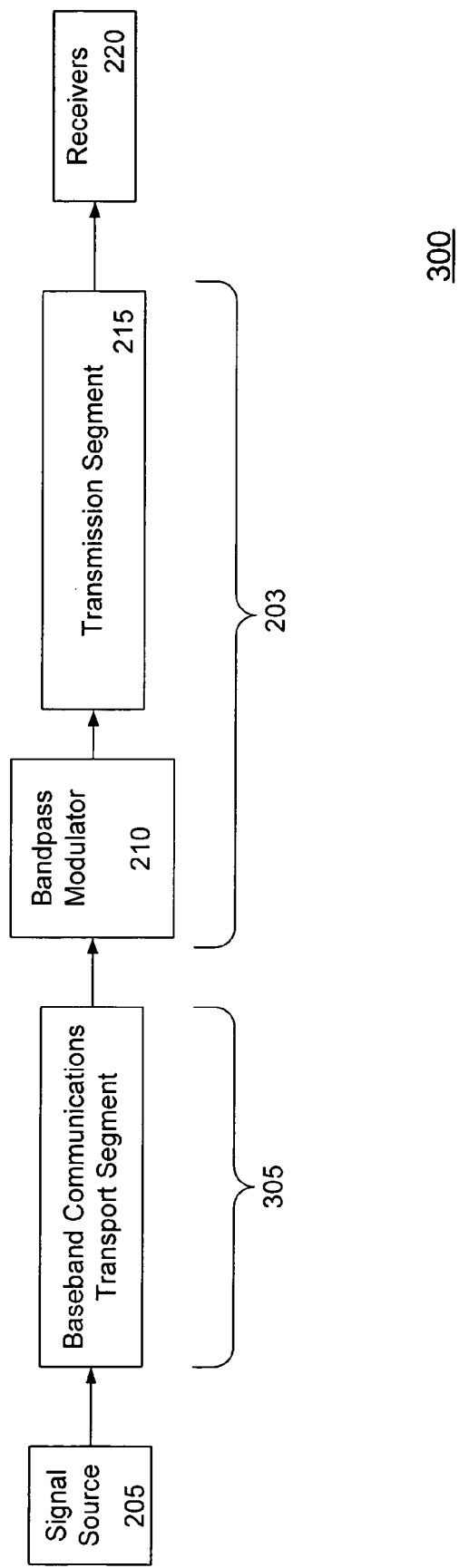
FIG. 3 illustrates a communications system, which includes the conventional communications system of FIG. 2 and a baseband communications transport segment.

In accordance with the present invention, the communications system 500 advantageously allows for greater communication distances between the signal source 205 and the receivers 220, high signal quality, and the efficient use of bandwidth up to the input of the transmission segment 215. Importantly, the communications system 500 does not require a bandpass modulator 210 (FIG. 3) at the end of every separate transport segment 520, such as the requirement of modulators 210 at the remote ends of the transport segments 305 according to the communications system 300 of FIG. 3. Notably, the present invention has an advantage in that the signal-processing equipment, i.e., the bandpass waveform generator 530, located at the end of every transport segment 520 is simpler, less expensive, and easier to manage than the complete bandpass modulator 210 and is discussed hereinbelow. Moreover, the system 500 according to the present invention has a further advantage over the communications system 400 of FIG. 4 in that the required modulation symbol transport segment bandwidth is low and is comparable to the bandwidth required in the baseband transport segment 305 (FIG. 3). More specifically, there is no requirement for excess bandwidth for signal alias images, guardband, or excess modulation bandwidth. Furthermore, the communications system 500 introduces no signal degradation such as the inherent signal degradation associated with the digital sampling processes of the communications system 400 of FIG. 4. Additionally, a cascade of transport and transmission segments can also be implemented in the system 500 of the present invention using regenerative repeaters in a known manner.

Referring to FIG. 5, the signal source 205 provides composite signals that are typically in an MPEG transport stream format to the modulation symbol processor 510, though it will be appreciated that other formats can be used. The composite signals are broadband signals that are transmitted in a broad frequency range, such as from 50 MHz to 870 MHz in the forward path. Primarily, the composite signals include video and audio signals, but may also include, either natively or within the transport stream packets, other data signals such as voice signals, Internet Protocol packets, or system control messages. The modulator symbol processor 510 then converts the signals into modulation symbols for transport to modulation symbol receivers located further downstream in the communications system 500.

Figure 6:
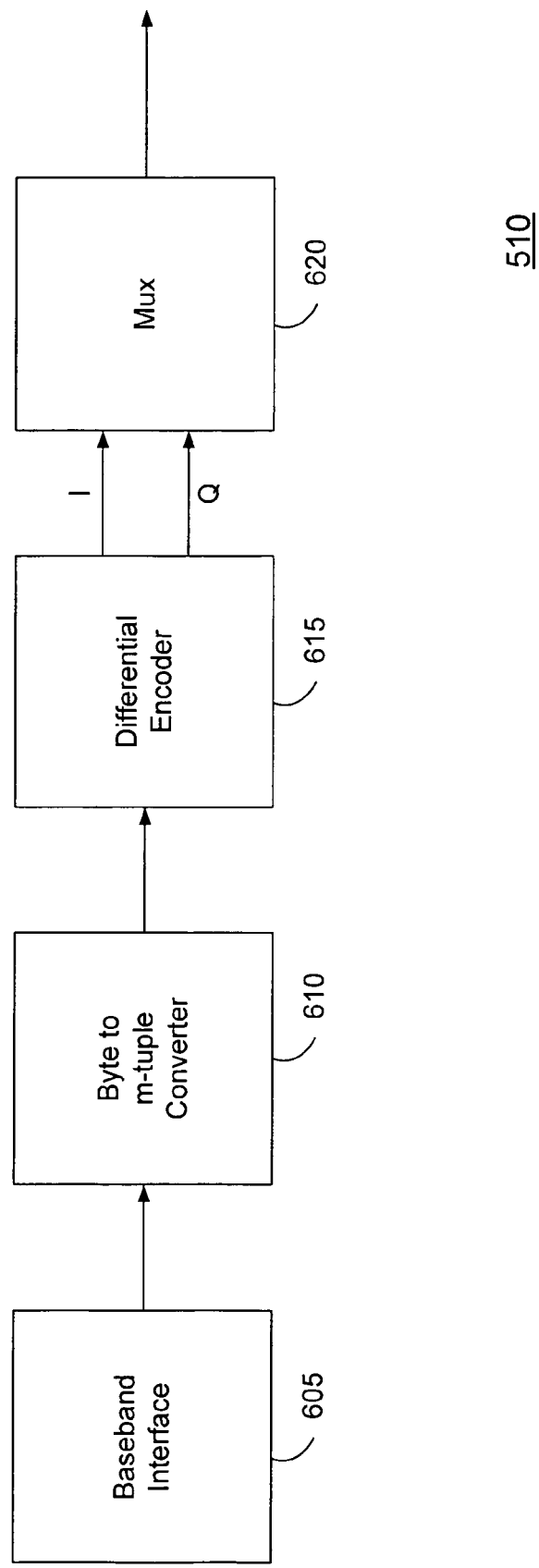
FIG. 6 illustrates a simplified block diagram of the modulation symbol processor, which is suitable for use in the communications system of FIG. 5.

FIG. 6 illustrates a simplified block diagram of the modulation symbol processor 510, which is suitable for use in the communications system 500 of FIG. 5. The modulation symbol processor 510 receives the signals from the signal source 205 and creates modulation symbols, where each modulation symbol is an encoded group of digital bits and represents one of a set of deterministic, finite energy waveforms. According to a preferred embodiment of the present invention, the source signals are initially provided to a baseband interface 605. In a known manner, the baseband interface 605 adapts the output data structure to the format of the signal source, such as the MPEG transport stream format. A byte-to-m-tuple converter 610 converts the output data structure into an exact mapping of bytes according to the modulation scheme that is being used in the system 500. Some examples of a modulation scheme are 64- or 256-QAM, phase shift keying, frequency shift keying, and m-ary vestigial side band. By way of example, for a 64-QAM modulation scheme, the byte-to-m-tuple converter 610 maps the constellation points according to the 64-QAM modulation scheme and provides, for example, 6-bit symbols or m-tuples. A differential encoder 615 then encodes the two most significant bits (MSBs) of each symbol in order to get a rotation-invariant constellation and provides I and Q bits. It will be appreciated that I represents the in-phase constellation points and Q represents the quadrature phase constellation points. A multiplexer 620 then multiplexes the encoded I and Q bit streams, i.e., the modulation symbols, to provide a single bit stream for transport along the transport segment 520. The symbol bit stream has a symbol rate depending upon the modulation scheme chosen, e.g., 5.057 Msymbols/s for 64-QAM or 5.361 Msymbols/s for 256-QAM. It will also be appreciated that the modulation symbol processor 510 as described and illustrated is not intended to limit the present invention and may also contain other functions, such as error correction. For example, other ways of providing modulation symbols are to use binary phase shift keying (BPSK) modulation or vestigial side band (VSB) modulation.

Referring again to FIG. 5, modulation symbols are continuously provided to the source end of the modulation symbol transport segment 520. The topology for the exemplary embodiment of the symbol transport segment 520 is generally a multidrop/multicast fiber optic access ring. It will be appreciated, however, that other network topologies, for example, networks such as: a point-to-point network; a mesh network; a star network; satellite links; or microwave terrestrial links, and various communications segment media may be used. The symbol transport segment protocol in the exemplary embodiment is packet-based in accordance with the emerging IEEE 802.17 standard for Resilient Packet Rings, but essentially any segment protocol of sufficient bandwidth may be utilized, such as a frame-based protocol. It will be appreciated that the segment protocol may have no more formatting or complexity than required to maintain the bit-groupings of the modulation symbols. Other examples of segment protocols may be Ethernet, Asynchronous Transfer Mode (ATM), and Synchronous Optical Network (SONET).

Figure 4:
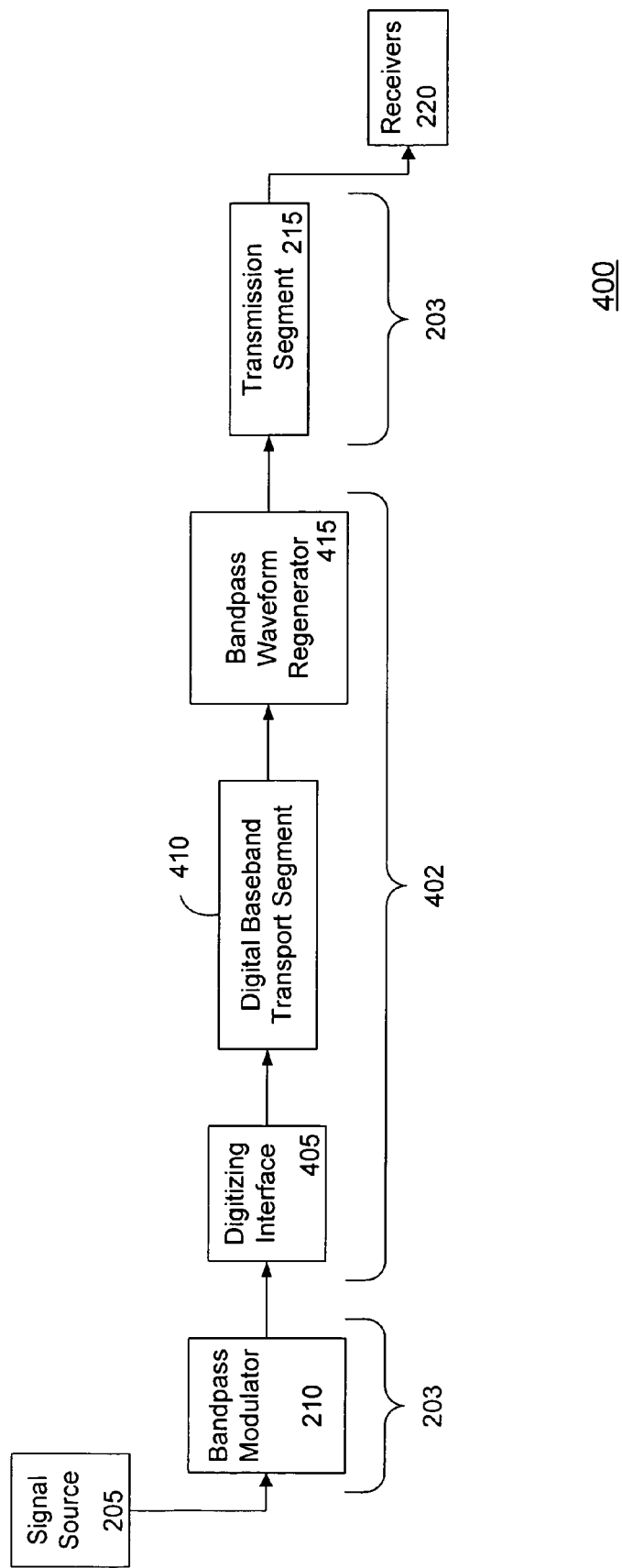
FIG. 4 illustrates a communications system, which includes the conventional communications system of FIG. 2 and a digital bandpass communications transport segment.

In an exemplary embodiment of the present invention, 40 Mbps of bandwidth is used within the symbol transport segment 520 to transport the modulation symbols, where the modulation symbols represent a 6 MHz wide 256-QAM bandpass signal. In comparison with other conventional systems, the baseband transport segment 305 of FIG. 3 uses 38.9 Mbps of bandwidth to communicate the source signals. As mentioned, however, the present invention is without the disadvantage of requiring a complete bandpass modulator 210 at the end of every baseband transport segment 305. Furthermore, in comparison with the digital baseband transport segment 410 of FIG. 4, the digital baseband transport segment 410 undesirably requires 148.5 Mbps to communicate the digitized bandpass signal along with the further disadvantage of introducing approximately 10 to 20 dB of degradation in the bandpass signal-to-noise ratio (SNR), which is measured at the input of the transmission segment 215 (FIG. 4).

Figure 1:
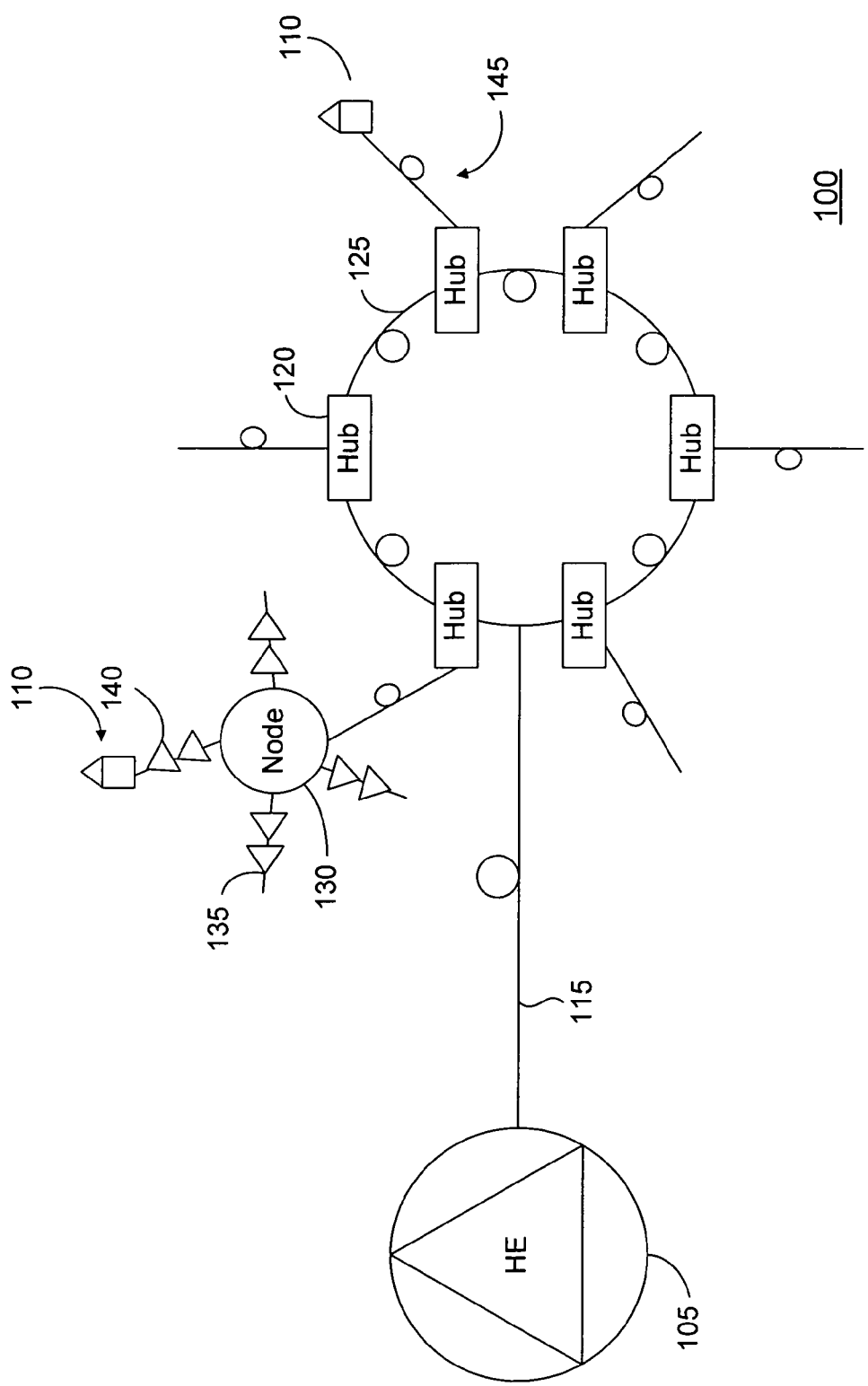
FIG. 1 is a block diagram illustrating an example of a conventional ring-type broadband communications system, such as a two-way hybrid/fiber coaxial (HFC) network.
Figure 2:
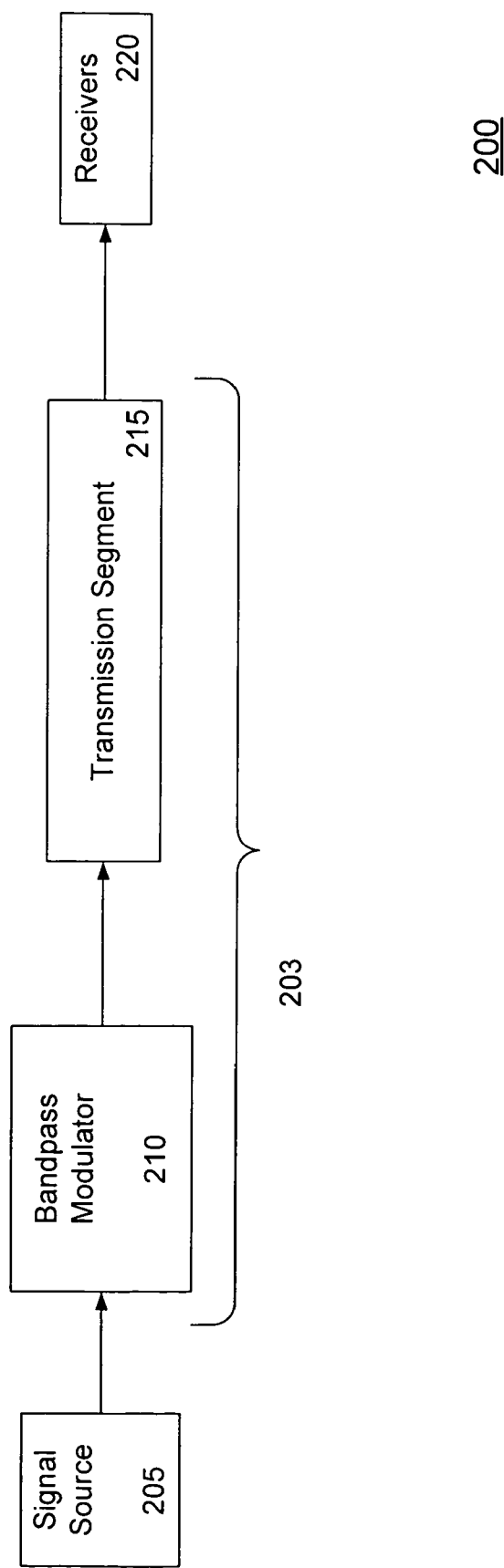
FIG. 2 is a block diagram illustrating an example of a conventional communications system.

In a further embodiment of the present invention, an entire bandpass modulator 525, which incorporates a symbol processor 510, can be used in instances where an operator already has bandpass modulators, such as modulator 210, that are in existence. In a conventional system, such as the systems illustrated in FIGS. 2, 3, and 4, intermediate signals, or modulation symbols, that are generated are subsequently provided to the modulation process, e.g., the process performed by QAM modulator 512, prior to transmission through the transmission segment 215b. In one embodiment, a splitter 518 is installed in the bandpass modulator 525 prior to the intermediate signals, or modulation symbols, reaching the QAM modulator 512. The modulation symbols are then provided to an output port 511 of the modulator 525. In another embodiment, the operator may also route portions of the modulation symbols to both the output port 511 and the QAM modulator 512. A portion of the modulation symbols is then transported via the symbol transport segment 520 and a portion of the modulation symbols are modulated by the modulator 512 in a known manner. The modulated signals provided by the modulator 512 are then transmitted over an existing transmission segment 215b in the conventional manner. Accordingly, an operator can economically, and as the need requires, upgrade the communications system in phases as opposed to all at once.

Figure 7:
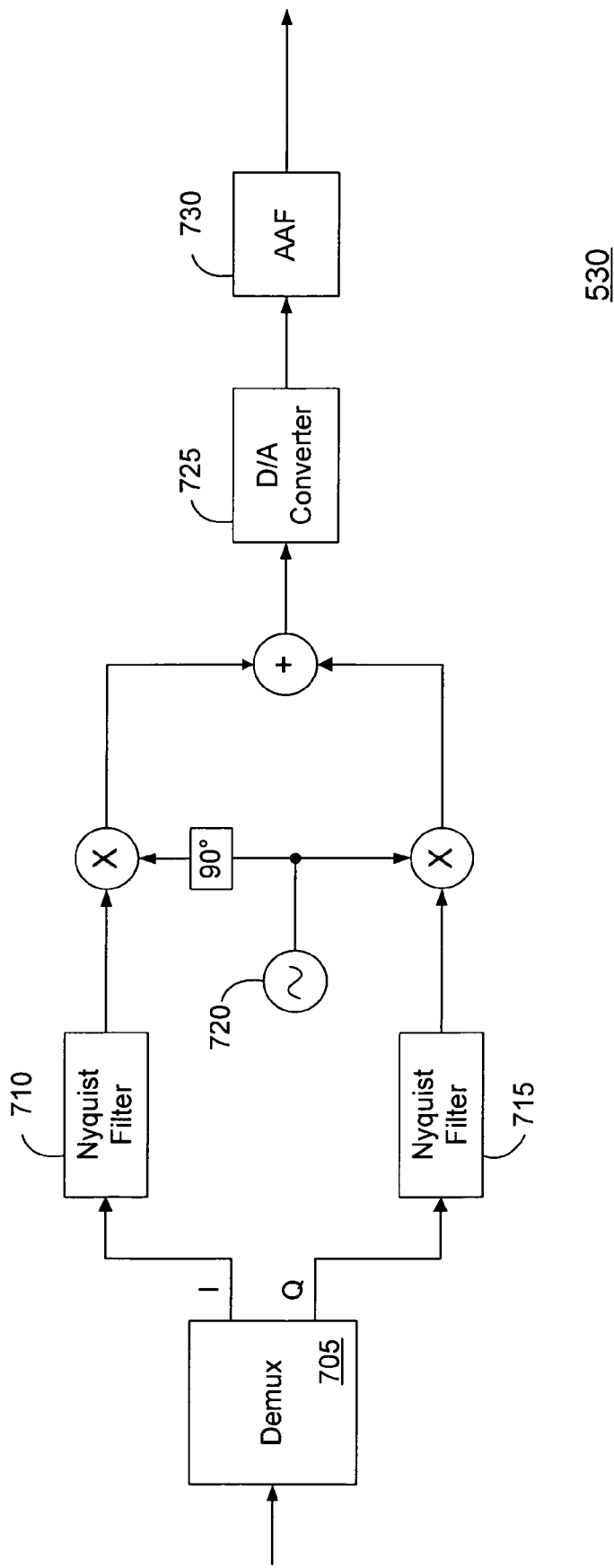
FIG. 7 illustrates a block diagram of the bandpass waveform generator in accordance with the present invention.

At the remote end of the symbol transport segment 520, the modulation symbols are provided to the bandpass waveform generator 530. FIG. 7 illustrates a block diagram of the bandpass waveform generator 530 in accordance with the present invention. The modulation symbols, which are transported as a multiplexed bit stream, are provided to a demultiplexer 705. The demultiplexer 705 demultiplexes the bit stream into the I and Q bit streams. Nyquist filters 710, 715 subsequently filter the I and Q signals. The filtered I signal is multiplexed with a sine carrier signal, which is a phase-shifted signal provided by a local oscillator 720. Similarly, the filtered Q signal is multiplexed with a cosine carrier signal, which is also provided by the local oscillator 720. The multiplexed signals are subsequently mixed and provided to a digital-to-analog (D/A) converter 725 for conversion to analog signals. An anti-aliasing filter 730 is provided for filtering any aliases that are inherent with the digitization process. Modulated baseband signals are then provided to the system for transmission via the transmission segment 215a to the plurality of receivers 220.

Figure 8:
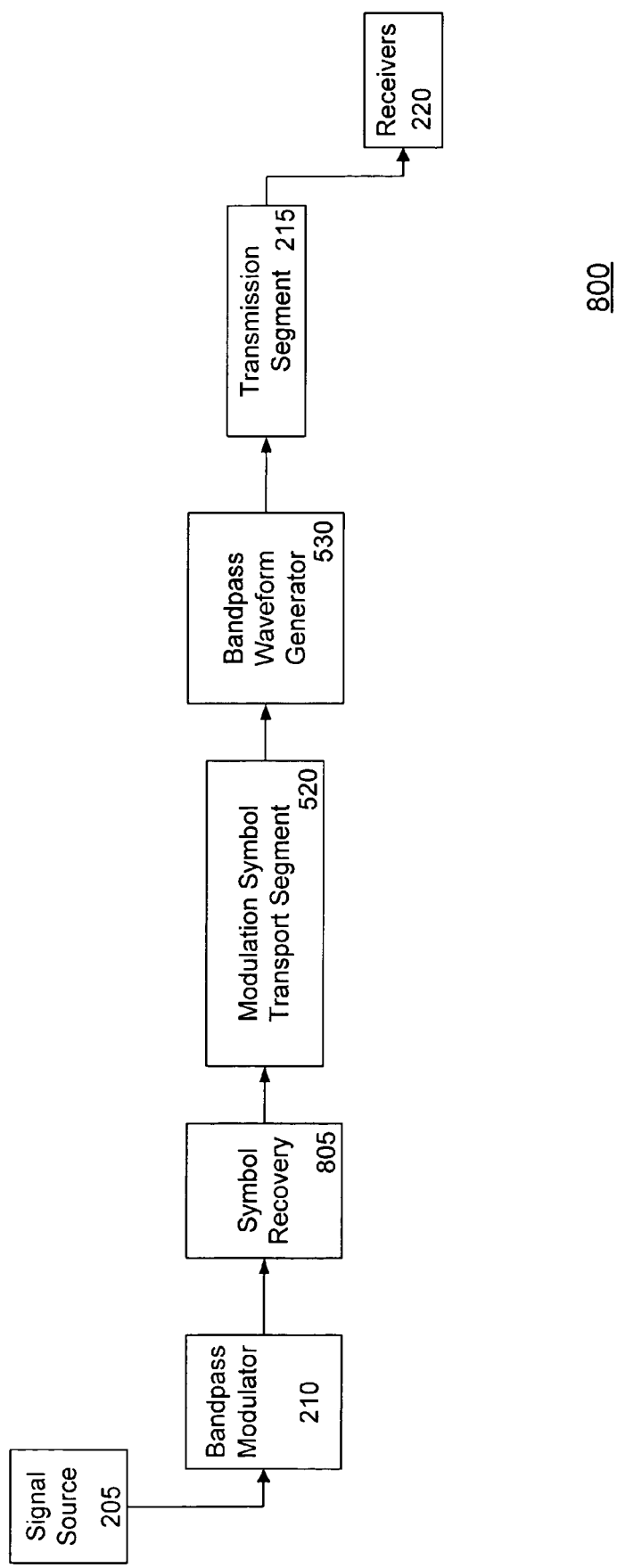
FIG. 8 is a block diagram illustrating an alternative embodiment of a communications system that transports modulation symbols in accordance with the present invention.

FIG. 8 is a block diagram illustrating an alternative embodiment of a communications system 800 that transports modulation symbols in accordance with the present invention. A symbol recovery apparatus 805 can be employed in the modulation symbol communications system 800 according to the present invention if modulation symbols are not physically or easily accessible in existing bandpass modulators 215 or if it is not economically feasible to replace existing bandpass modulators 215 with the modulation symbol processor 510 (FIG. 5). Accordingly, the signal source 205 provides signals to the existing bandpass modulator 210. The output modulated baseband signals are subsequently provided to the symbol recovery apparatus 805. Recovered modulation symbols are then transported via the symbol transport segment 520. At the remote end of the symbol transport segment 520, the bandpass waveform generator 530 modulates the modulation symbols as described hereinabove and provides modulated baseband signals. The transmission segment 215 then transmits the modulated baseband signals to the plurality of receivers 220.

Accordingly, the alternative embodiment of the communications system 800 receives the benefits of transporting modulation symbols without having to replace existing bandpass modulators 210. It will be appreciated that the modulation symbols may also be transported and handed off directly to the plurality of receivers 550 without first being modulated or transmitted over the transmission segment 215. Accordingly, the receivers 550 can be equipped to decode the modulation symbols in the known manner, thereby bypassing the bandpass waveform generators 530 of FIG. 5. Advantageously, bypassing the bandpass waveform generator 530 and directly providing the modulation symbols directly to the receiver 550 eliminates the need for the receiver 550 to have an radio frequency (RF) tuner.

In summary, transporting modulation symbols via the symbol transport segment 520 is a novel and efficient method of transporting information signals. Advantageously, the system 500, 800 transports signals over greater distances using less bandwidth than most of the conventional systems while not degrading the signal quality or requiring expensive equipment at the remote ends of all communications segments.

What is claimed is:

1. A method for transmitting digital information indicative of source signals, the method comprising:
    generating one or more modulation symbols, wherein each modulation symbol is an encoded group of bits representing one of a set of deterministic finite energy waveforms;
    generating a plurality of bit streams that comprise the modulation symbols, wherein each bit stream carries information corresponding to different points of a constellation associated with each modulation symbol;
    transmitting the plurality of bit streams through a digital transport medium from a first location to at least a second location;
    receiving the plurality of bit streams from the digital transport medium at the second location; and
    generating a waveform by digitally filtering the modulation symbols in the plurality of bit streams received at the second location to generate analog signals for further transmission to a plurality of receivers.

2. The method of claim 1, wherein generating one or more modulation symbols further comprises generating the one or more modulation symbols by adapting the source signal to an output structure according to the format of the source signal and converting the output structure to an exact mapping of bytes according to a modulation scheme to produce a mapped data structure.

3. The method of claim 2, wherein generating further comprises generating the plurality of bit streams from the mapped data structure using a differential encoder to produce a first bit stream representing in phase constellation points and a second bit stream representing quadrature phase constellation points.

4. The method of claim 3, wherein generating a waveform further comprises generating the waveform by digitally filtering the first bit stream to produce an in phase waveform and digitally filtering the second bit stream to produce a quadrature phase waveform.

5. The method of claim 1, further comprising multiplexing the plurality of bit streams to produce a multiplexed bit stream for transmission from the first location to the second location, and demultiplexing the multiplexed bit stream received at the second location to reproduce the plurality of bits streams.

6. A transport system comprising:
    processing means configured to produce a plurality of bit streams that comprise modulation symbols, wherein each modulation symbol is an encoded group of bits representing one of a set of deterministic finite energy waveforms and wherein each bit stream carries information corresponding to different points of a constellation associated with each modulation symbol;
    at least one digital transport segment coupled to the processing means for transporting the plurality of bit streams from a first location to at least a second location; and
    a bandpass waveform generator coupled to a remote end of the digital transport segment at the second location, wherein the bandpass waveform generator is configured to apply the modulation symbols in the plurality of bit streams to a digital filter that generates analog signals for further transmission to a plurality of receivers.

7. A system comprising:
    processing means configured to receive information signals and to produce a bit stream that comprises modulation symbols, wherein each modulation symbol is an encoded group of bits representing one of a set of deterministic finite energy waveforms and wherein the bit stream encapsulates information corresponding to one or more points of a constellation associated with each modulation symbol, the processing means comprising:
- a splitter that is configured to split the bit stream into first and second bit streams;
- a modulator coupled to the splitter and configured to modulate the first bit stream to produce a first modulated bandpass signal; and
- an output port coupled to the splitter and configured to receive and output the second bit stream;

a digital transport segment coupled to the output port for transporting the second bit stream from a first location to a second location; and modulating means comprising a digital filter and configured to produce a modulated bandpass signal using the second bit stream received at the second location to transmit the modulated bandpass signal to a plurality of receivers.

8. The system of claim 7, further comprising: a first transmission segment coupled to the modulator for transmitting the first modulated bandpass signal to a plurality of receivers.

9. The system of claim 7, wherein the modulating means is included in a hub.

10. The system of claim 7, wherein the modulating means is configured to apply the modulation symbols to the digital filter that generates analog signals for further transmission.

11. The system of claim 7, wherein the second bit stream received at the second location from the digital transport segment is provided directly to a symbol processing unit included in each of a plurality of receivers.

12. The system of claim 7, wherein the processing means is further configured to receive an information signal comprising a radio frequency modulated signal and to recover symbols therein to produce the bit stream.

13. A method comprising:
adapting an information signal so as to produce a bit stream that comprises modulation symbols, wherein each modulation symbol is an encoded group of bits representing one of a set of deterministic finite energy waveforms and wherein the bit stream encapsulates information corresponding to one or more points of a constellation associated with each modulation symbol;
transporting the bit stream from a first location over each of a plurality of digital communications links to a plurality of second locations;
receiving the bit stream at each of the plurality of second locations via the digital communications links;
generating a waveform by digitally filtering the modulation symbols received at each of the plurality of second locations; and
modulating a carrier signal with the waveform to produce a modulated bandpass signal for transmission from respective ones of the plurality of second locations to a plurality of receivers.

14. The method of claim 13, and further comprising supplying the bit stream received at one or more of the plurality of second locations directly to a symbol processing unit in a receiver.

15. The method of claim 13, wherein generating the waveform comprises digitally filtering the bit stream to produce analog signals for further transmission.

16. The method of claim 13, wherein adapting further comprises adapting the information signal to an output structure according to the format of an information signal source.

17. The method of claim 16, wherein adapting further comprises adapting the output structure to an exact mapping of bytes according to a modulation scheme to produce a mapped data structure.

18. The method of claim 17, wherein adapting further comprises adapting the mapped data structure via a differential encoder to produce a first bit stream representing in phase constellation points and a second bit stream representing quadrature phase constellation points.

19. The method of claim 18, wherein generating further comprises generating the waveform by digitally filtering the first bit stream to produce an in phase waveform and digitally filtering the second bit stream to produce a quadrature phase waveform.

20. A system comprising:
processing means for accepting as input information signals, wherein the processing means is configured for formatting, encoding, and framing the information signals and for generating a bit stream that comprises modulation symbols, wherein each modulation symbol is an encoded group of bits representing one of a set of deterministic finite energy waveforms and wherein the bit stream encapsulates information corresponding to one or more points of a constellation associated with each modulation symbol;
a digital transport segment that is configured to transport the bit stream from a first location to a second location;
at the second location, means for digitally filtering the modulation symbols in the bit stream to produce analog signals for further transmission; and
modulating means that is configured to modulate a carrier with the waveform output by said means for digitally filtering to produce a modulated signal for transmission to a plurality of receivers.

* * * * *